(12) United States Patent
Jung

(10) Patent No.: US 10,300,378 B2
(45) Date of Patent: May 28, 2019

(54) ONLINE GAME EXPERIENCE USING MULTIPLE DEVICES

(71) Applicant: Empire Technology Development LLC, Wilmington, DE (US)

(72) Inventor: Yang-Won Jung, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 15/657,869

(22) Filed: Jul. 24, 2017

(65) Prior Publication Data

US 2017/0319955 A1   Nov. 9, 2017

Related U.S. Application Data

(63) Continuation of application No. 13/635,273, filed as application No. PCT/US2012/034555 on Apr. 20, 2012, now Pat. No. 9,713,765.

(51) Int. Cl.
| | |
|---|---|
| *A63F 13/12* | (2006.01) |
| *A63F 13/323* | (2014.01) |
| *A63F 13/30* | (2014.01) |
| *A63F 13/26* | (2014.01) |
| *A63F 13/216* | (2014.01) |

(52) U.S. Cl.
CPC .......... *A63F 13/323* (2014.09); *A63F 13/12* (2013.01); *A63F 13/216* (2014.09); *A63F 13/26* (2014.09)

(58) Field of Classification Search
CPC ........ A63F 13/12; A63F 13/26; A63F 13/216; A63F 13/323
See application file for complete search history.

(56) References Cited

U.S. PATENT DOCUMENTS

| | | |
|---|---|---|
| 6,524,189 B1 | 2/2003 | Rautila |
| 6,544,126 B2 | 4/2003 | Sawano et al. |
| 6,921,336 B1 | 7/2005 | Best |
| 7,695,363 B2 | 4/2010 | Gilliland et al. |
| 2004/0266529 A1 | 12/2004 | Chatani |
| 2005/0221895 A1 | 10/2005 | Lum et al. |
| 2006/0030408 A1 | 2/2006 | Kiiskinen |
| 2006/0063590 A1 | 3/2006 | Abassi et al. |
| 2006/0160614 A1 | 7/2006 | Walker et al. |
| 2007/0021216 A1 | 1/2007 | Guruparan |

(Continued)

OTHER PUBLICATIONS

Bisignano, M., et al., "An "intent-oriented" approach for Multi-Device User Interface Design," Proceedings of the 12th International Conference on Advanced Information Networking, vol. 2, pp. 186-194 (Apr. 18-20, 2006).

(Continued)

*Primary Examiner* — David L Lewis
*Assistant Examiner* — Shauna-Kay Hall

(57) ABSTRACT

Technologies and implementations for providing an online game experience using multiple devices are generally disclosed including methods and devices for, in some examples, receiving first data from a first device, the received first data being associated with a first interaction with the online game, receiving a request to utilize a second device and responsive to the received request, transmitting second data to the second device, the second data being associated with a second interaction with the online game, the second interaction related to first interaction but being different from the first interaction.

19 Claims, 5 Drawing Sheets

(56) References Cited

U.S. PATENT DOCUMENTS

| | | | |
|---|---|---|---|
| 2007/0093294 A1 | 4/2007 | Serafat et al. | |
| 2007/0099703 A1 | 5/2007 | Terebilo | |
| 2008/0119269 A1 | 5/2008 | Nonaka et al. | |
| 2008/0146343 A1 | 6/2008 | Sullivan et al. | |
| 2008/0300049 A1 | 12/2008 | Anderson et al. | |
| 2009/0002316 A1* | 1/2009 | Rofougaran | A63F 13/12 345/156 |
| 2009/0011832 A1 | 1/2009 | Rofougaran | |
| 2009/0118016 A1* | 5/2009 | Ben-Artzi | G07F 17/32 463/42 |
| 2009/0137315 A1 | 5/2009 | Wu | |
| 2009/0143143 A1 | 6/2009 | Rofougaran | |
| 2009/0292640 A1 | 11/2009 | Heatherly | |
| 2010/0041457 A1 | 2/2010 | Cook et al. | |
| 2010/0053164 A1 | 3/2010 | Imai et al. | |
| 2010/0069158 A1 | 3/2010 | Kim | |
| 2010/0081375 A1* | 4/2010 | Rosenblatt | G08C 17/02 455/41.1 |
| 2010/0160031 A1 | 6/2010 | Gilliland et al. | |
| 2010/0216552 A1 | 8/2010 | Rose et al. | |
| 2010/0240455 A1 | 9/2010 | Gagner et al. | |
| 2010/0248841 A1 | 9/2010 | Hsiao | |
| 2010/0311483 A1 | 12/2010 | Fields et al. | |
| 2010/0331082 A1 | 12/2010 | Kim et al. | |
| 2011/0021271 A1* | 1/2011 | Ikeda | A63F 13/235 463/30 |
| 2011/0086631 A1* | 4/2011 | Park | H04M 1/7253 455/419 |
| 2011/0106954 A1* | 5/2011 | Chatterjee | G06F 1/1632 709/227 |
| 2011/0111842 A1 | 5/2011 | Walker et al. | |
| 2011/0118030 A1 | 5/2011 | Walley et al. | |
| 2011/0159813 A1* | 6/2011 | Mallinson | H04M 1/7253 455/41.2 |
| 2011/0190052 A1 | 8/2011 | Takeda et al. | |
| 2011/0199304 A1 | 8/2011 | Walley et al. | |
| 2011/0314168 A1 | 12/2011 | Bathiche et al. | |
| 2012/0017236 A1 | 1/2012 | Stafford et al. | |
| 2012/0094757 A1 | 4/2012 | Vago et al. | |
| 2012/0115555 A1 | 5/2012 | Cho et al. | |
| 2012/0249424 A1 | 10/2012 | Bove et al. | |
| 2012/0287343 A1* | 11/2012 | Kelly | G06F 3/1438 348/554 |
| 2012/0309537 A1 | 12/2012 | Nogami et al. | |
| 2013/0017884 A1 | 1/2013 | Price et al. | |
| 2013/0130777 A1 | 5/2013 | Lemay et al. | |
| 2013/0154958 A1 | 6/2013 | Clavin et al. | |
| 2015/0011318 A1 | 1/2015 | Takahashi | |

OTHER PUBLICATIONS

International Search Report and Witten Opinion for International Application No. PCT/US2012/034555 dated Jul. 9, 2012, pp. 8.

"Connected Entertainment: A New Interactive Experience," accessed at http://www.microsoft.com/china/ard/en/innoforum/innoforum_10.mspx , May 1, 2008, pp. 3.

\* cited by examiner

800 A computer program product

802 A signal bearing medium

804 Machine-readable instructions that, when executed, operatively enable an online game provider control module to:

receive first data from a first device, the received first data being associated with a first interaction with the online game;

receive a request to utilize a second device;

responsive to the received request, transmit second data to the second device, the second data being associated with a second interaction with the online game, the second interaction related to the first interaction but being different from the first interaction;

determine if the second device is a registered device, and include an indication of a non-registered device with the second data, if it is determined that the second device is not a registered device;

determine a capability of the second device, and customize the second data based at least in part on the determined capability of the second device;

determine a location of the first device, determine a location of the second device, determine a distance between the location of the first device and the location of the second device, and if it is determined that the determined distance between the location of the first device and the location of the second device is greater than a predetermined distance, include an indication of a proximity error with the second data; and determine a location and orientation of the first device, determine a location and orientation of the second device, and include relational interactive data with the second data, wherein the relational interactive data includes data configured to utilize the location and orientation of the first device relative to the location and orientation of the second device.

| 806 a computer-readable medium | 808 a recordable medium | 810 a communications medium |

Fig. 8

ONLINE GAME EXPERIENCE USING MULTIPLE DEVICES

CROSS-REFERENCE TO RELATED APPLICATIONS

The present application is a continuation application under 35 U.S.C. § 120 of U.S. application Ser. No. 13/635,273, filed on Sep. 14, 2012, now U.S. Pat. No. 9,713,765, which is a U.S. National Stage filing under 35 U.S.C. § 371 of International Application No. PCT/US2012/034555, filed on Apr. 20, 2012. U.S. application Ser. No. 13/635,273 and International Application No. PCT/US2012/034555 are hereby incorporated by reference in their entireties.

BACKGROUND

Unless otherwise indicated herein, the approaches described in this section are not prior art to the claims in this application and are not admitted to be prior art by inclusion in this section.

Conventional online computer games often provide interaction with a user through a single computing device. This interaction may include different types of information, such as, for example, display information. Due to the complexity of many online games, the display information may include a number of different pieces of information. Accordingly, in order to fully experience the online game, a computing device having a display large enough to view the different items of information is required. The alternative to using a sufficiently large display is to run the game at less than an optimal resolution, view smaller pieces of information at a time, or the like. Accordingly, although a computing device with a smaller than optimal display (e.g., a laptop, a tablet, a smart-phone, or the like) may be capable of allowing a user to play an online computer game, the display of the computing device may not be large enough to fully interact with the game.

SUMMARY

Detailed herein are various illustrative methods for providing an online game experience. Example methods may include receiving first data from a first device, the received first data being associated with a first interaction with the online game, receiving a request to utilize a second device, and responsive to the received request, transmitting second data to the second device, the second data being associated with a second interaction with the online game, the second interaction related to the first interaction but being different from the first interaction.

The present disclosure also describes various example machine readable non-transitory medium having stored therein instructions that, when executed, cause a device to provide an online game experience. Example machine readable non-transitory medium may have stored therein instructions that, when executed by one or more processors, operatively enable an online game provider control module to receive first data from a first device, the received first data being associated with a first interaction with the online game, receive a request to utilize a second device, and responsive to the received request, transmit second data to the second device, the second data being associated with a second interaction with the online game, the second interaction related to the first interaction but being different from the first interaction.

The present disclosure additionally describes example devices for providing an online game experience. Example devices may include a first device operable to have a first interaction with an online game and a second device operable to receive data of the online game to facilitate utilization of the second device with the first device, the data capable of providing a second interaction with the online game, wherein the second interaction is related to the first interaction but different from the first interaction.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are, therefore, not to be considered limiting of its scope. The disclosure will be described with additional specificity and detail through use of the accompanying drawings.

In the drawings:

FIG. 8 illustrates an example computer program product; and

DETAILED DESCRIPTION

Figure 1:
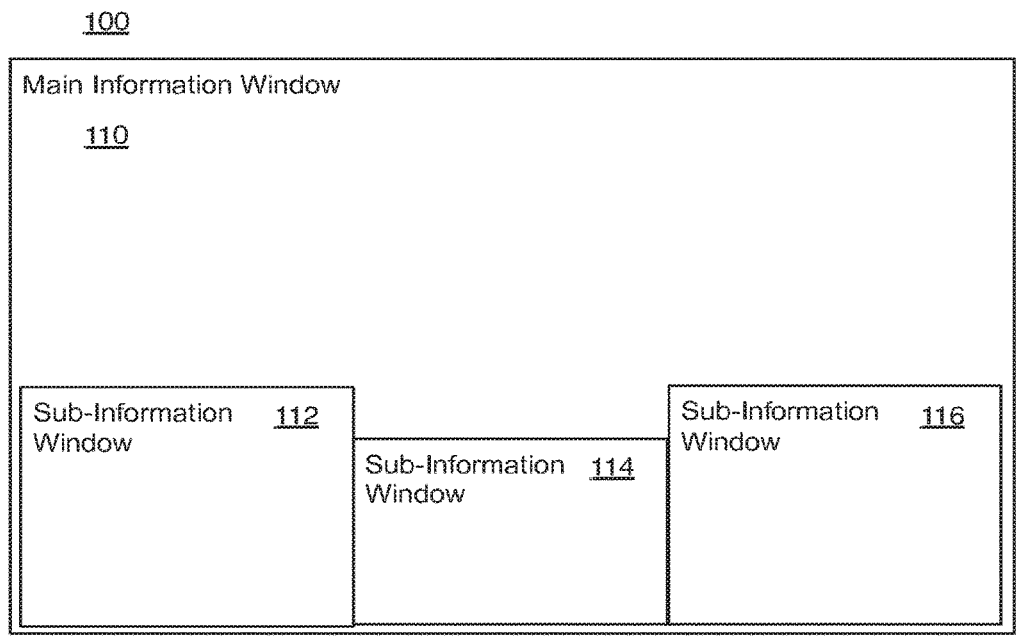
FIG. 1 illustrates a block diagram of an example display associated with an online game experience.

The following description sets forth various examples along with specific details to provide a thorough understanding of claimed subject matter. It will be understood by those skilled in the art that claimed subject matter might be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, devices, systems and computer readable media related to providing an online game experience that uses multiple devices for interaction with the online game.

Conventional online computer games allow a user to interact with the online game through a single computing device. For example, as part of the interaction, the computing device may display information about the online computer game. More specifically, the online computer game may include display information, and a display component of the computing device may use the display information to provide an interaction with the online game. An online computer game experience typically includes multiple pieces of display information. Accordingly, the computing device may display these different pieces of information simultaneously as part of the online game experience.

For example, an online driving game experience may include a main window (e.g., view from the driver's seat perspective, view from the front bumper, or the like). Additionally, the driving game experience may include a number of other windows (e.g., instrument panel, speedometer, rear view mirror, side view mirror, map, or the like). Accordingly, in order to experience (e.g., "play") the online driving game, a user may use a computing device to display the windows and provide feedback (e.g., gas pedal pressure, brake pedal pressure, steering wheel movement, or the like) to the online game. The online game provider may then use the feedback to update the windows (e.g., view from the driver seat, speedometer, etc.) displayed on the computing device. As indicated, with conventional online computer games, a single computing device (e.g., a laptop computer, a game console or the like) may display all these windows. More specifically, a user may use a single computing device to "play" the online game, which would include viewing the main view (e.g., view from the driver's perspective) and other windows (e.g., view of the speedometer, side view mirror, etc.) on the computing device.

As indicated above, with various implementations of the disclosed subject matter, multiple computing devices may be used to experience an online game. Accordingly, using the online driving game example given above, a tablet computer may be used to display the main window (e.g., view from the driver seat, or the like) while a smart phone may be used to display another window (e.g., the speedometer, side view mirror, or the like). Furthermore, feedback (e.g., gas pedal pressure, steering wheel movement, or the like) may be provided using one or more of these multiple devices. This example is given as illustrative only and is not intended to be limiting. This example, along with other examples and implementations for using multiple computing devices to experience an online game will be apparent from the following detailed disclosure.

Although care is taken herein to distinguish between an online computer game, the computer resources (e.g., a server, or the like) providing the online computer game, the computing devices (e.g., laptop computer, tablet computer, or the like) used to experience the online game and the experience of playing the online computer game, there may be instances where their usage is not consistent. As such, it is to be appreciated that those of ordinary skill in the art will be able to correctly distinguish between the different usages of online game in this disclosure from the context of the usage.

FIG. 1 illustrates a block diagram of an example display associated with an online game experience, arranged in accordance with at least some embodiments of the present disclosure. In particular, FIG. 1 shows a display 100 including a main information window 110 and sub-information windows 112, 114 and 116. The information windows 110, 112, 114 and 116 may be used to display different pieces or items of information (e.g., views, maps, items, statuses, metrics, qualities, characteristics, or the like) related to an online game experience. With some online games, the online game may continually update the information displayed in the windows 110, 112, 114 and/or 116. More particularly, as the online game experience progresses or changes, the information displayed in the windows 110, 112, 114 and/or 116 may be changed.

As can be appreciated, in order to fully experience an online game, a computing device with a display large enough to show the windows (e.g., the windows 110, 112, 114 and 116) associated with the online game interaction is needed. However, many computing devices (e.g., smart phones, tablet computers, ultra-book laptops, or the like) may not have displays large enough to show all the windows associated with an online game experience. Such computing devices (e.g., those with smaller displays) are commonly used today. Furthermore, users may often carry more than one computing device with a smaller display (e.g., a smartphone and a tablet).

As such, various implementations of the disclosed subject matter may be provided to allow an interaction with an online game using two or more computing devices. For example, a user's interaction with an online computer game may include simultaneously displaying the windows 110, 112, 114 and/or 116 using multiple computing devices. It is to be appreciated that online games may provide for a different number or configuration of windows than represented in FIG. 1. FIG. 1 is shown for illustrative purposes only, and although referenced throughout this disclosure, it is not intended to be limiting.

Figure 2:
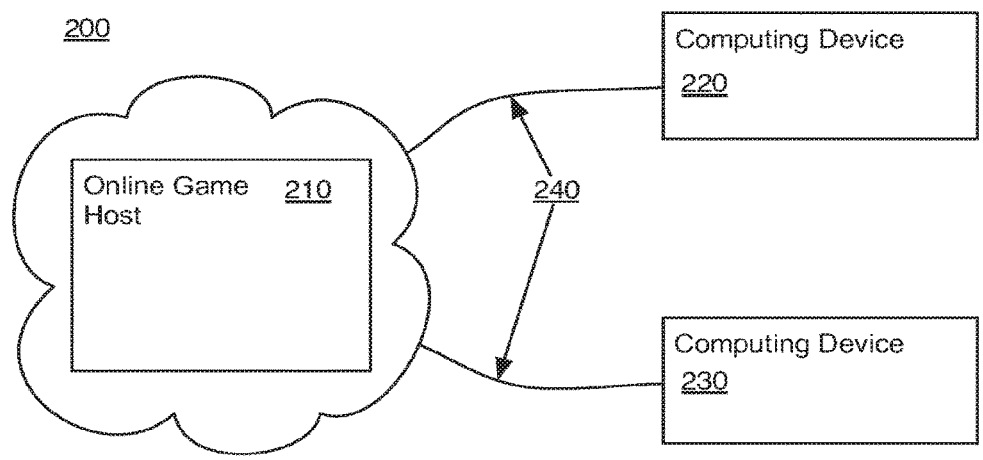
FIG. 2 illustrates a block diagram of an example system for providing an online game experience.

FIG. 2 illustrates a block diagram of an example system for providing an online game experience, arranged in accordance with at least some embodiments of the present disclosure. In particular, FIG. 2 shows an online game environment 200 including an online game host 210 and computing devices 220 and 230. The online game host 210 (e.g., a computer server, a virtual machine, a cloud based resource, a console game system, a desktop computer, or the like) may be configured to provide an online game experience. As will be appreciated, the online game host 210 may be configured to provide a variety of different types of online game experiences. For example, the online game host 210 may provide a massively multi-player online game (MMOG), a single person game, a co-op game, or other type of online game. Additionally, the online game host 210 may provide a role-playing game, strategy game, first person game, or other type of game. With various implementations, the online game host 210 may be a computing resource (e.g., as detailed above) executing online computer game software, which provides for an interaction with the online computer game using the computing devices 220 and 230.

As stated, the computing devices 220 and the computing device 230 may facilitate an interaction with the online game host 210. In various implementations, the computing device 220 may be a gaming console, a desktop computer, a laptop computer, a tablet computer, a smart phone, a mobile phone, a personal digital assistant, or the like. In various implementations, the computing device 230 may be a gaming console, a desktop computer, a laptop computer, a tablet computer, a smart phone, a mobile phone, a personal digital assistant, or the like. The computing devices 220 and 230 may connect to the online game host 210 through a connection 240 (e.g. a wired internet connection, a wireless internet connection, a mobile internet connection, a VPN connection, or the like).

With some implementations, the connection 240 facilitates transmitting data between the online game host 210 and the computing devices 220 and 230. For example, in some implementations, the connection 240 may an Internet connection. Accordingly, the online game host 210 may be connected to the Internet (e.g., through an ISP, an Internet backbone, or the like) and may be configured to transmit and/or receive (e.g., using TCP/IP, UDP, RSVP, DCCP, or the like) data to and/or from the computing devices 220 and 230. Additionally, the first computing devices 220 and 230 may be connected to the Internet (e.g., through a wired Internet connection, a wireless Internet connection, a mobile Internet connection, or the like) and may be configured to transmit and/or receive data to and/or from the online game host 210.

In some implementations, one of the computing devices 220 or 230 may function as a proxy connection to the other computing device 220 or 230. For example, the computing devices 220 and 230 may be connected (e.g., over Bluetooth, Wifi, USB, or the like). As such, one of the computing devices 220 or 230 may be a proxy for communication the online game host 210 from the other computing device.

As indicated, the computing devices 220 and 230 may be used to interact with the online game host 210, in order to experience an online game. In some implementations, the online game host 210 may transmit data (e.g., input feedback, or the like) related to the online game experience to the computing devices 220 and/or 230. Alternatively, the computing devices 220 and/or 230 may transmit data related to the online game experience to the online game host 210. For example, the online game host 210 may transmit display data to the computing devices 220 and 230. The computing devices 220 and 230 may then use the display data to display information about the online game experience for a user. For example, the display data sent to the computing device 220 may correspond to the main information windows 110 while the display data sent to the computing device 230 may correspond to the sub-information windows 112, 114 and 116.

In some implementations, different users (e.g., players of the online game) may use the computing devices 220 and 230. For example, a first player may be using the computing devices 220 and 230 to interact with an online game. Additionally, a second player may be using one of the computing devices 220 or 230 to interact with an online game. As such, the shared computing device may be used to display common data for both the first and the second players' online experience.

FIGS. 3-7 illustrate flow charts of example methods for providing an online game experience, arranged in accordance with some embodiments of the present disclosure. In some portions of the description, illustrative implementations of the methods are described with reference to elements of the display 100 and environment 200 depicted in FIGS. 1 and 2. However, the described embodiments are not limited to these depictions. More specifically, some elements depicted in FIGS. 1 and 2 may be omitted from example implementations of the methods detailed herein. Furthermore, other elements not depicted in FIGS. 1 and 2 may be used to implement example methods.

Additionally, FIGS. 3-7 employ block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and others not described, rearrangements, substitutions, changes, modifications, etc., may be made without departing from the scope of claimed subject matter.

Figure 3:
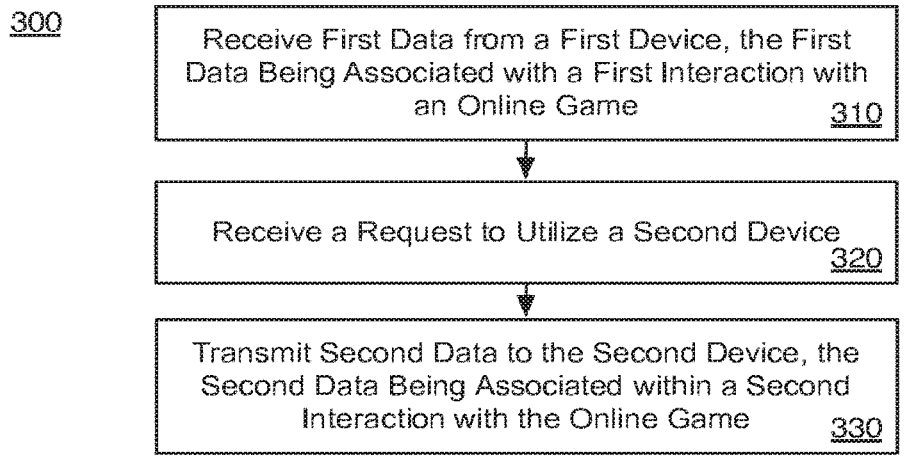
FIG. 3 illustrates a flow diagram of an example method for providing an online game experience.

FIG. 3 illustrates an example method 300 for providing an online game experience, arranged in accordance with at least some embodiments of the present disclosure. Beginning at block 310, "Receive First Data from a First Device, the First Data Being Associated with a First Interaction with an Online Game", the online game host 210 may include logic and/or features configured to receive data related to an online game experience from one of the computing devices 220 or 230. In general, at block 310, the online game host 210 may be interacting with one of the computing devices 220 or 230. More particularly, an online game may be "played" (e.g., experienced) using one of the computing devices 220 or 230 and the online game host 210.

For example, the computing device 220 may be used to play an online game in conjunction with the online game host 210. As part of playing the online game, the online game host 210 may send (e.g., transmit, convey, broadcast, share, or the like) data to the computing device 220. Additionally, the computing device 220 may send data to the online game host 210.

As will be appreciated from this disclosure, it may be convenient to refer to the computing device 220 as the "first computing device 220" and the computing device 230 as the "second computing device 230". Accordingly, at block 310, the online game host 210 may receive data related to an interaction with an online game from the first computing device 220. It is to be appreciated, that although the computing device 220 and the computing device 230 are referred to as the first and second computing devices respectively, the disclosed technology is not limited in such regard. For example, the first computing device may be the computing device 230. Additionally, as an online game is experienced, the first computing device may refer to different computing devices. For example, initially, the first computing device may refer to the computing device 220. Subsequently, the first computing device may refer to the computing device 230. More particularly, if a first, second and third computing devices were being used to interact with an online game, a user may decide to discontinue use of the first computing device but keep playing the game with the second and third computing devices. Accordingly, the second or third computing devices may then become the "first" computing device.

As indicated, at block 310, the online game host 210 may receive data from the first computing device 220. In various implementations, the data may be login data associated with a user of the online game. For example, a user desiring to experience the online game may log into the online game host 210 using the first computing device 220. Accordingly, the online game host 210 may receive data associated with the login (e.g., user name, password, desired login detailed, or the like) from the first computing device 220.

In some implementations, the data may relate to a selection (e.g., action, choice, request, invitation, entry, or the like) regarding some aspect of the online game experience. For example, the data may be related to a character's movement within the online game. Alternatively or additionally, the data may be related to a message (e.g., chat, text, email, or the like) between users of the online game. Accordingly, as detailed above, as part of an online game experience (e.g., playing an online game, or the like) the online game host 210 may receive data from the first computing device 220.

Continuing from block 310 to block 320, "Receive a Request to Utilize a Second Device", the online game host 210 may include logic and/or features configured to receive a request to utilize the second computing device 230. In general, the online game host 210 may receive a request to include the second computing device 230 in the interaction with the online game. In some implementations, a user may desire to utilize both computing devices 220 and 230 to experience an online game, as such, a request to utilize the second computing device 230 may be made by the user from the first computing device 220.

With some implementations, the request to utilize the second computing device 230 may be made from the second computing device. For example, software executing on the second computing device 230 may send a request to the online game host 210 that the second computing device 230 be used to interact with the online game. Alternatively, or additionally, loading a specific webpage in a browser of the second computing device 230 may cause a request to utilize the second computing device 230 to the online game host 210.

With some examples, the first computing device 220 and the second computing device 230 may be registered (e.g., during online game client software installation, online game user account creation, or the like) with the online game host 210. Subsequently, the online game host 210 may identify available computing devices (e.g., the second computing device 230) and suggest these (or one or more of these) devices be used to interact with the online game.

In some implementations, the online game host 210 may scan for available computing devices. For example, the online game host 210 may search for computing devices proximally located (e.g., via wifi scan, local network scan, or the like) to the first computing device 220. The online game host 210 may then suggest that one or more of these identified devices be used to interact with the online game.

In some examples, where the online game host 210 suggests available devices with which to interact with the online game, a request to use one of the devices may be automatically generated. For example, if a registered device is identified as available, the online game host 210 may automatically generate a request to use the identified device.

Continuing from block 320 to block 330, "Transmit Second Data to the Second Device, the Second Data Being Associated with a Second Interaction with the Online Game", the online game host 210 may include logic and/or features configured to send second data to the second computing device 230. In general, the online game host 210 may send (e.g., transmit, convey, broadcast, share, or the like) data related to an interaction with the online game to the second computing device 230. In some implementations, the second data may be display data as detailed above. For example, the second data may be data facilitating the display of the windows 112, 114 and/or 116 on the second computing device 230.

In various implementations, more than two computing devices may be used to interact with the online game through the online game host 210. For example, the first and second computing devices 220 and 230 may be used to interact with an online game as detailed above. Additionally, a third computing device (not shown in FIG. 2) may be used to interact with the online game in a similar manner as detailed above in conjunction with the second computing device 230.

Figure 4:
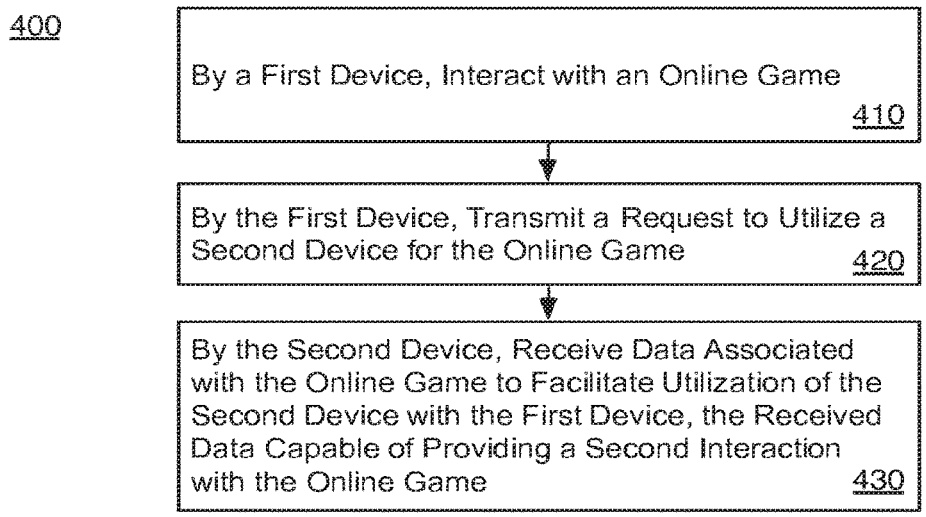
FIG. 4 illustrates a flow diagram of an example method for providing an online game interaction.

FIG. 4 illustrates a method 400 for interacting with an online game, arranged in accordance with at least some embodiments of the present disclosure. Beginning at block 410, "By a First Device, Interact with an Online Game", the first computing device 220 may include logic and/or features configured to interact with the online game host 210. In general, the first computing device 220 may interact with an online game provided by the online game host 210 at block 410. For example, the first computing device may receive data (e.g., display data) associated with an interaction with the online game from the online game host 210 at block 410. In some implementations, a user may be playing an online game provided by the online game host 210 with the first computing device 220. As such, as part of playing the online game, the first computing device 220 may interact with the online game host 210 at block 410.

Continuing at block 420, "By the First Device, Transmit a Request to Utilize a Second Device for the Online Game", the first computing device 220 may include logic and/or features configured to transmit a request to utilize the second computing device 230 to the online game host 210. In general, a request to utilize the second computing device 230 as part of the interaction with the online game may be made by the first computing device 220 at block 420. A number of illustrative examples of receiving a request to utilize the second computing device 230 to interact with the online game are detailed above. Particularly with respect to block 320 of FIG. 3. It will be appreciated that these examples may be adapted to block 420. As such, these examples are not repeated here.

It is to be appreciated, however, as detailed above, that the first computing device 220 may not initiate the request. For example, the online game host 210 may identify the second computing device 230 as being available for interaction with the online game. The online game host 210 may transmit an indication of availability and option to use the second computing device 230 to the first computing device 220. Then, the first computing device 220 may accept the option to use the second computing device 230 at block 420.

Continuing at block 430, "By the Second Device, Receive Data Associated with the Online Game to Facilitate Utilization of the Second Device with the First Device, the Received Data Capable of Providing a Second Interaction with the Online Game", the second computing device 230 may include logic and/or features configured to receive data associated with the online game from the online game host 210. In general, the second computing device 230 may receive data (e.g., display data) related to the online game experience. A number of illustrative examples of the online game host 210 sending data to the second computing device 230 are discussed above. Particularly with respect to block 330 of FIG. 3. It will be appreciated that these examples and the discussion of block 330 are similar to block 430. As such, these examples are not repeated here.

Figure 5:
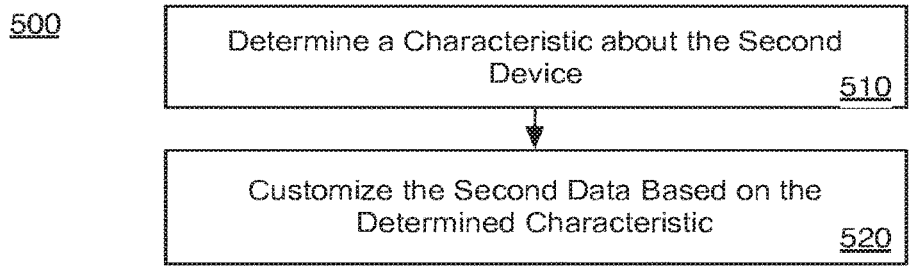
FIG. 5 illustrates a flow diagram of an example method for supplementing an online game experience.
Figure 6:
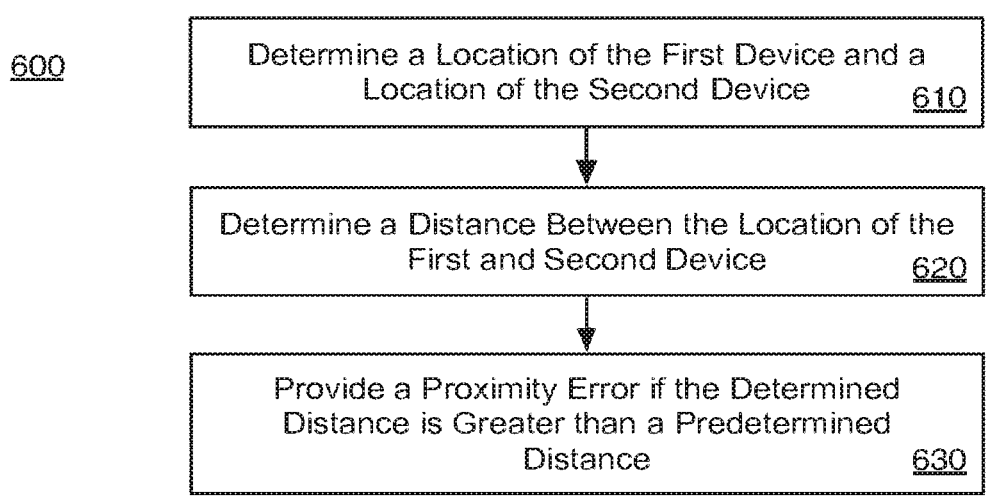
FIG. 6 illustrates a flow diagram of an example method for supplementing an online game experience.
Figure 7:
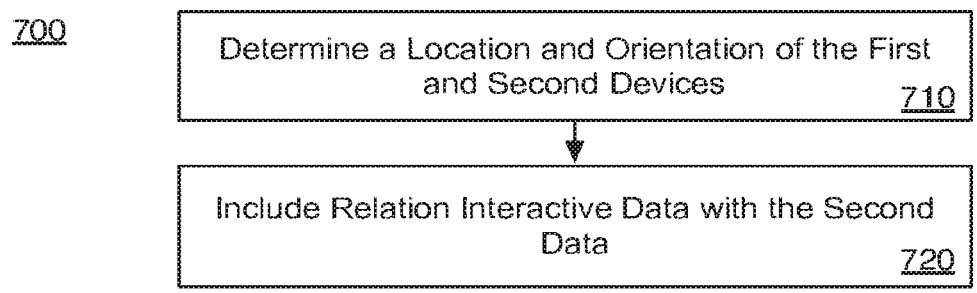
FIG. 7 illustrates a flow diagram of an example method for supplementing an online game experience.

FIGS. 5-7 illustrate methods for supplementing an online game experience, arranged in accordance with at least some embodiments of the present disclosure. In various implementations, the methods detailed in FIGS. 5-7 may be provided in conjunction with the above detailed method 300, or other methods detailed herein. The following discussion of FIGS. 5-7 references the method 300 of FIG. 3 for clarity of presentation only and is not intended to be limiting. For example, although the methods shown in FIGS. 5-7 are discussed with respect to the method 300, they may be provided in conjunction with the method 400 of FIG. 4 or other methods detailed herein.

As each of FIGS. 5-7 are discussed with reference to the method 300 of FIG. 3, the method 300 is briefly reviewed here, prior to the discussion of FIGS. 5-7. As detailed above, the online game host 210 may allow for interaction with an online game by the first computing device 220 and the second computing device 230. For example, the method 300 may provide for the online game host 210 to receive data related to an interaction with an online game from the first computing device 220 at block 310. The online game host 210 may receive a request to utilize the second computing device 220 as part of the online game experience at block 320. Then, responsive to the received request, the online game host 210 may transmit second data to the second computing device 230 at block 330.

Each of FIGS. 5-7 are herein discussed in turn. The discussion assumes an existing interaction with an online game, and sometimes references terms (e.g., "the second data") from the discussion of FIG. 3. It may be assumed that these terms are understood from the above description and as such, they need not repeated here for purposes of brevity.

Turning to FIG. 5, shown is a method 500 for supplementing an online game experience, arranged in accordance with at least some embodiments of the present disclosure. Beginning at block 510, "Determine a Characteristic about the Second Device", the online game host 210 may include logic and/or features configured to determine a characteristic about the second computing device 230. In general, the online game host 210 may determine a characteristic about the second computing device that may be used to customize the second data (e.g., the data transmitted to the second computing device 230 at block 330). Continuing at block 520, "Customize the Second Data Based on the Determined Characteristic", the online game host 210 may include logic and/or features configured to customize the second data based on the determined characteristic.

In various implementations, the online game host 210 may determine whether the second computing device 230 is a registered device at block 510. For example, as detailed above, in some implementations, computing devices (e.g., the computing devices 220 and 230) may be registered with an online game. Accordingly, the online game host 210 may check that the second computing device 230 is registered at block 510. Subsequently, if it is determined that the computing device 230 is not a registered device, the second data may be customized to include an indication that the second computing device 230 is a non-registered device at block 520.

With some implementations, the determined characteristic is a capability of the second computing device 230. For example, if the second computing device 230 includes a touch enabled screen, the second data may be customized to take advantage of the touch enabled screen. For example, if one of the windows 110, 112, 114 and/or 116 includes selection data, then the second data may be customized to include that window such that the touch enabled screen may be used to conveniently select the data from the window.

In some implementations, the determined characteristic may be another feature (e.g., size of the display, processing speed, audio speaker, or the like) of the second computing device 230. Subsequently, the online game host 210 can customize the second data to take advantage of the determined characteristic. For example, if it is determined that the second computing device includes an audio speaker, then the online game host 210 may include audio data within the second data.

Turning to FIG. 6, shown is a method 600 for supplementing an online game experience, arranged in accordance with at least some embodiments of the present disclosure. Beginning at block 610, "Determine a Location of the First Device and a Location of the Second Device", the online game host 210 may include logic and/or features for determining a location of a computing device. In general, the online game host 210 may determine the location (e.g., using GPS, using location-aware browsing, or the like) for the first and second computing devices 220 and 230 at block 610.

Continuing from block 610 to 620, "Determine a Distance Between the Location of the First and Second Device", the online game host 210 may include logic and/or features to determine the distance between the locations of the first computing device 220 and the second computing device 230. Continuing from block 620 to 630, "Provide a Proximity Error if the Determined Distance is Greater than a Predetermined Distance", the online game host 210 may include logic and/or features to provide a proximity distance error. For example, if the distance between the location of the first computing device 220 and the second computing device 230 is greater than a threshold distance, the online game host 210 may provide a proximity distance error to either or both of the computing devices 220 and 230.

Turning to FIG. 7, a method 700 for supplementing an online game experience, arranged in accordance with at least some embodiments of the present disclosure. Beginning at block 710, "Determine a Location and Orientation of the First and Second devices", the online game host 210 may include logic and/or features to determine the location and orientation of a computing device. In general, the online game host 210 may determine the location and orientation (e.g., using a gyroscope, electro-magnetic compass, or the like), of the first and second computing devices 220 and 230. In various implementations, the location and orientation of one of the computing devices may be determined in relation to the other computing device.

Continuing from block 710 to block 720, "Include Relation Interactive Data with the Second Data", the online game host 210 may include relational interactive data in the second data. In general, the online game host 210 may include data that relates to the determined relative location and orientation. For example, if it is determined that the second computing device 230 is located adjacent and to the right of the of the first computing device 220, then the second data may include display data corresponding to views adjacent and to the right of what is displayed in the first computing device 220.

In general, the methods described with respect to FIGS. 3-7 and elsewhere herein may be implemented as a computer program product, executable on any suitable computing system, or the like. For example, a computer program product for providing an online game experience may be provided. Example computer program products are described with respect to FIG. 8 and elsewhere herein.

FIG. 8 illustrates an example computer program product 800, arranged in accordance with at least some embodiments of the present disclosure. Computer program product 800 may include machine readable non-transitory medium having stored therein a plurality of instructions that, when executed, operatively enable an online game provider control module to provide an online game experience according to the processes and methods discussed herein. Computer program product 800 may include a signal bearing medium 802. Signal bearing medium 802 may include one or more machine-readable instructions 804, which, when executed by one or more processors, may operatively enable a computing device to provide the functionality described herein. In various examples, some or all of the machine-readable instructions may be used by the devices discussed herein.

In some examples, the machine readable instructions 804 may include receiving first data from a first device, the received first data being associated with a first interaction with the online game. In some examples, the machine readable instructions 804 may include receiving a request to utilize a second device. In some examples, the machine readable instructions 804 may include transmitting, in response to a received request, second data to the second device, the second data being associated with a second interaction with the online game, the second interaction related to the first interaction but being different from the first interaction. In some examples, the machine readable instructions 804 may include determining if the second device is a registered device, and include an indication of a non-registered device with the second data, if it is determined that the second device is not a registered device. In some examples, the machine readable instructions 804 may include determining a capability of the second device, and customize the second data based at least in part on the determined capability of the second device. In some examples, the machine readable instructions 804 may include determining a location of the first device, determine a location of the second device, determine a distance between the location of the first device and the location of the second device, and if it is determined that the determined distance between the location of the first device and the location of the second device is greater than a predetermined distance, include an indication of a proximity error with the second data. In some examples, the machine readable instructions 804 may include determining a location and orientation of the first device, determine a location and orientation of the second device, and include relational interactive data with the second data, wherein the relational interactive data includes data configured to utilize the location and orientation of the first device relative to the location and orientation of the second device.

In some implementations, signal bearing medium 802 may encompass a computer-readable medium 806, such as, but not limited to, a hard disk drive (HDD), a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communication link, a wireless communication link, etc.). In some examples, the signal bearing medium 802 may encompass a machine readable non-transitory medium.

In general, the methods described with respect to FIGS. 3-7 and elsewhere herein may be implemented in any suitable server and/or computing system. Example systems may be described with respect to FIG. 9 and elsewhere herein. In general, the computer system may be configured to provide an online game experience.

Figure 9:
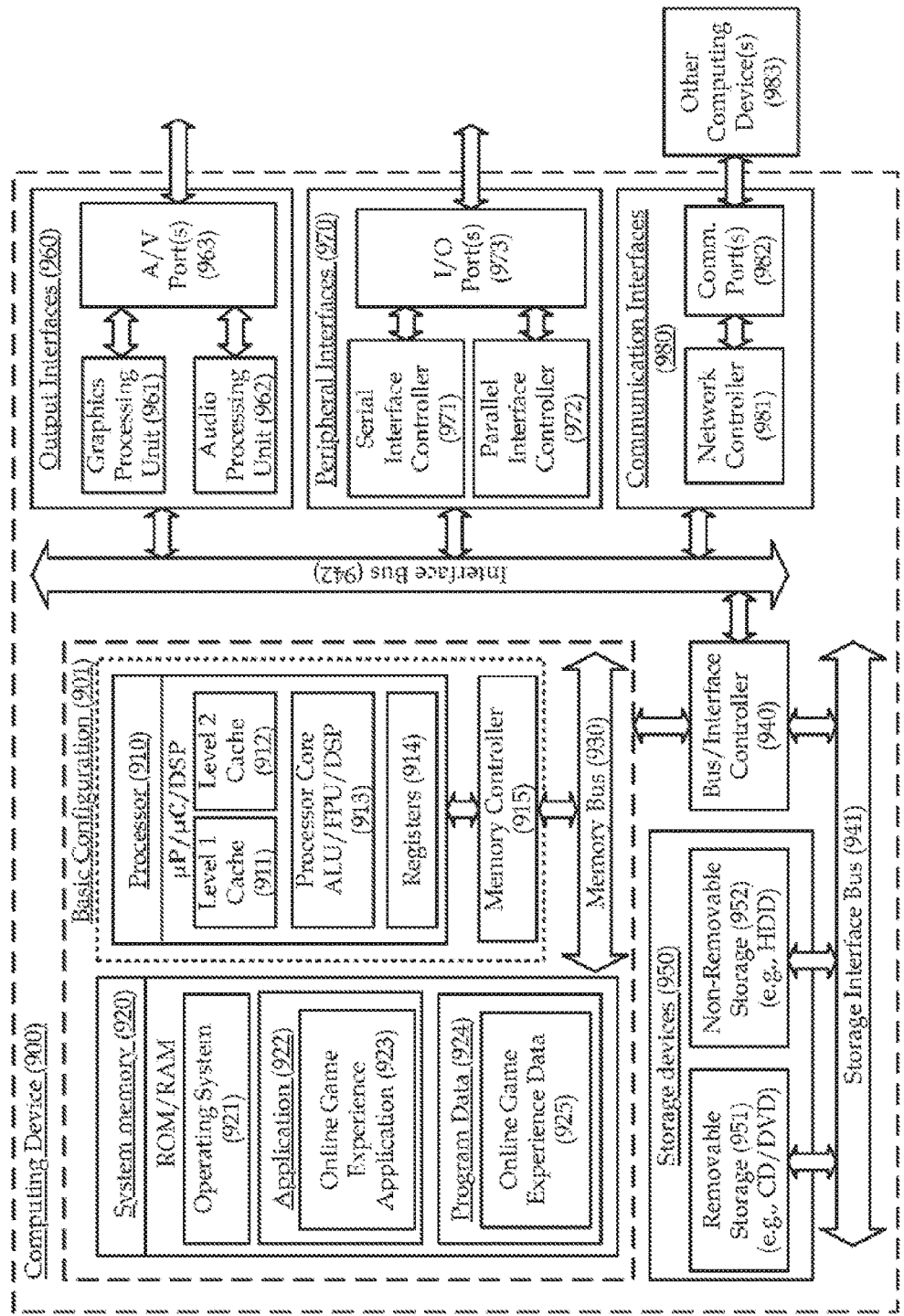
FIG. 9 illustrates a block diagram of an example computing device, all arranged in accordance with at least some embodiments of the present disclosure.

FIG. 9 is a block diagram illustrating an example computing device 900, arranged in accordance with at least some embodiments of the present disclosure. In various examples, computing device 900 may be configured to provide an online game experience as an online game host as discussed herein. In various examples, computing device 900 may be configured to provide an interaction with an online game as a computing device or multiple computing devices as discussed herein. In one example of a basic configuration 901, computing device 900 may include one or more processors 910 and a system memory 920. A memory bus 930 can be used for communicating between the one or more processors 910 and the system memory 920.

Depending on the desired configuration, the one or more processors 910 may be of any type including but not limited to a microprocessor (μP), a microcontroller (μC), a digital signal processor (DSP), or any combination thereof. The one or more processors 910 may include one or more levels of caching, such as a level one cache 911 and a level two cache 912, a processor core 913, and registers 914. The processor core 913 can include an arithmetic logic unit (ALU), a floating point unit (FPU), a digital signal processing core (DSP core), or any combination thereof. A memory controller 915 can also be used with the one or more processors 910, or in some implementations, the memory controller 915 can be an internal part of the processor 910.

Depending on the desired configuration, the system memory 920 may be of any type including but not limited to volatile memory (such as RAM), non-volatile memory (such as ROM, flash memory, etc.) or any combination thereof. The system memory 920 may include an operating system 921, one or more applications 922, and program data 924. The one or more applications 922 may include online game experience application 923 that can be arranged to perform the functions, actions, and/or operations as described herein including the functional blocks, actions, and/or operations described herein. The program data 924 may include online game experience data 925 for use with online game experience application 923. In some example embodiments, the one or more applications 922 may be arranged to operate with the program data 924 on the operating system 921. This described basic configuration 901 is illustrated in FIG. 9 by those components within dashed line.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. The one or more data storage devices 950 may be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 920, the removable storage 951 and the non-removable storage 952 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 942 for facilitating communication from various interface devices (e.g., output interfaces, peripheral interfaces, and communication interfaces) to the basic configuration 901 via the bus/interface controller 940. Example output interfaces 960 may include a graphics processing unit 961 and an audio processing unit 962, which may be configured to communicate to various external devices such as a display or speakers via one or more A/V ports 963. Example peripheral interfaces 970 may include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 983 over a network communication via one or more communication ports 982. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 900 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 900 may also be implemented as a personal computer including both laptop computer and non-laptop computer configurations. In addition, the computing device 900 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A processor-implemented method to provide a gaming experience, the method comprising:
   identifying, by a processor, a first device and a second device for interaction with a game;
   sending, by the processor to the first device, first data, related to the game, for display via a main information window of the first device;
   determining, by the processor, a distance between the first device and the second device; and
   in response to determining that the distance between the first device and the second device is greater than a specific distance:
      customizing, by the processor, second data, related to the game, to include an indication of a proximity error in the second data; and
      sending, by the processor to the second device, the customized second data for display via a sub-information window of the second device, wherein the sub-information window of the second device is configured to display data that is distinct from data displayed in the main information window of the first device.

2. The method of claim 1, further comprising:
   determining, by the processor, whether the second device is a registered device; and
   including, by the processor, an indication of a non-registered device with the second data, in response to determining that the second device is non-registered.

3. The method of claim 1, further comprising:
   determining, by the processor, whether the second device has a touch screen; and
   in response to determining that the second device has the touch screen, selecting, by the processor, the sub-information window of the second device for presentation of the customized second data on the touch screen.

4. The method of claim 1, wherein identifying the second device comprises identifying one or more available secondary devices that are suitable for interaction with the game, and wherein the one or more available secondary devices are located within the specific distance from the first device.

5. The method of claim 1, further comprising:
   identifying the second data based on a location and an orientation of the second device relative to the first device.

6. A processor-implemented method to provide a gaming experience, wherein the processor-implemented method is performed by a game host, the processor-implemented method comprising:
   identifying a first device and a second device for interaction with a game;
   transmitting first data, related to the game, to the first device, for display via a main information window of the first device;
   determining a location and an orientation of the second device relative to the first device; and
   identifying, based on the location and the orientation of the second device relative to the first device, second data related to the game; and
   transmitting the second data to the second device for display via a sub-information window of the second device, wherein the sub-information window is configured to display data that is distinct from data displayed in the main information window of the first device.

7. The method of claim 6, further comprising:
   determining whether the second device has a touch screen; and
   in response to determining that the second device has the touch screen, selecting the sub-information window of the second device for presentation of the second data on the touch screen.

8. The method of claim 6, further comprising:
   determining a distance between the first device and the second device; and
   in response to determining that the distance between the first device and the second device is greater than a specific distance, transmitting, in the second data, a proximity error to the second device.

9. The method of claim 6, wherein the second data comprises data that is indicative of the second device being a non-registered device.

10. A game system, comprising:
    a first device that includes a main information window; and
    a second device that includes a sub-information window, wherein:
    the first device is operable to obtain, from a game host, first data, related to a game, for display via the main information window of the first device, and
    the second device is operable to obtain, from the game host, second data, related to the game, for display via the sub-information window of the second device,
    the second data includes proximity error data that is indicative of a distance between the first device and the second device being greater than a specific distance, and
    the sub-information window is configured to display data that is distinct from data displayed on the main information window of the first device.

11. The game system of claim 10, wherein the first device is further operable to:
    obtain, from the game host, a list of secondary devices available for interaction with the game; and transmit, to the game host, a request to utilize one or more of the secondary devices, on the list of secondary devices, to display the second data related to the game.

12. The game system of claim 10, wherein the second device is further operable to:
    determine whether a specific webpage is loaded in a browser of the second device; and
    in response to a determination that the specific webpage is loaded in the browser, transmit a request to the game host, wherein the request indicates that the second device is available for utilization, as a component of the game, concurrently with the first device.

13. The game system of claim 10, wherein the first device comprises a game console.

14. The game system of claim 10, wherein the second device comprises a mobile device.

15. The game system of claim 14, wherein the mobile device comprises at least one of: a mobile phone, a personal digital assistant, a laptop computer, or a tablet personal computer.

16. A non-transitory computer-readable medium that includes computer executable instructions stored thereon, wherein the computer executable instructions, in response to execution by a processor, cause the processor to perform or control performance of operations that comprise:
    identify a first device and a second device for interaction with a game;
    end, to the first device, first data, related to the game, for display via a main information window of the first device;
    determine a distance between the first device and the second distance; and
    in response to a determination that the distance between the first device and the second device is greater than a specific distance:
        customize second data, related to the game, to include of an indication of a proximity error in the second data; and
        end, to the second device, the customized second data for display via a sub-information window of the second device, wherein the sub-information window of the second device is configured to display data that is distinct from data displayed in the main information window of the first device.

17. The non-transitory computer-readable medium of claim 16, wherein the computer executable instructions, in response to execution by the processor, further cause the processor to perform or control performance of at least one operation that comprises:
    identify one or more available secondary devices that are suitable for interaction with the game, wherein the one or more available secondary devices are located within the specific distance from the first device.

18. The non-transitory computer-readable medium of claim 16, wherein the sub-information window is selected based on a location and an orientation of the second device relative to the first device.

19. The non-transitory computer-readable medium of claim 16, wherein the computer executable instructions, in response to execution by the processor, further cause the processor to perform or control performance of at least one operation that comprises:
    determine that a specific webpage is loaded in a browser of the second device; and
    in response to the determination that the specific page is loaded in the browser, send, to the first device, an indication that the second device is available for utilization, as a component of the game, concurrently with the first device.

* * * * *

UNITED STATES PATENT AND TRADEMARK OFFICE
CERTIFICATE OF CORRECTION

PATENT NO. : 10,300,378 B2  
APPLICATION NO. : 15/657869  
DATED : May 28, 2019  
INVENTOR(S) : Jung Page 1 of 1

It is certified that error appears in the above-identified patent and that said Letters Patent is hereby corrected as shown below:

In the Claims

In Column 20, Line 4, please delete "end" and insert -- send -- therefor.

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*